United States Patent [19]
Brunson et al.

[11] Patent Number: 5,311,576
[45] Date of Patent: May 10, 1994

[54] ADJUNCT PROCESSOR EMBEDDED IN A SWITCHING SYSTEM

[75] Inventors: Gordon R. Brunson, Broomfield; Robert D. Reeder, Westminster, both of Colo.

[73] Assignee: AT&T Bell Laboratories, Murray Hill, N.J.

[21] Appl. No.: 826,345

[22] Filed: Jan. 27, 1992

[51] Int. Cl.[5] ............... H04M 3/50; H04Q 11/08
[52] U.S. Cl. ................................. 379/89; 370/61; 370/85.1; 379/201; 379/214; 379/269
[58] Field of Search ............... 379/89, 201, 88, 269, 379/214; 370/62, 61, 67, 85.1

[56] References Cited

U.S. PATENT DOCUMENTS

| | | | |
|---|---|---|---|
| 4,612,416 | 9/1986 | Emerson et al. | 379/88 |
| 4,640,992 | 2/1987 | Rose | 379/89 |
| 4,653,085 | 3/1987 | Chan et al. | 379/94 |
| 4,787,081 | 11/1988 | Waters et al. | 370/85 |
| 4,873,718 | 10/1989 | Barnett et al. | 379/156 |
| 4,879,743 | 11/1989 | Burke et al. | 379/142 |
| 4,967,408 | 10/1990 | Phan | 370/62 |

FOREIGN PATENT DOCUMENTS 8604474 7/1986 World Int. Prop. O. .... H04M 3/50

OTHER PUBLICATIONS

Meridian—Meridian Mail Option—Quality Voice Messaging Fully Integrated with the Meridian SL-1, product brochure, (Sep. 1988), Northern Telecom, Inc.
Meridian—Meridian Mail Option—Quality Voice Messaging Fully Integrated with the Meridian SL-1 ST and RT, product brochure, (May 1988), Northern Telecom, Inc.
Meridian SL-1—Meridian Mail—Your Processing Solution, product brochure, Northern Telecom, Inc. (undated).
Consultant Bulletin, No. CP-443-G, Northern Telecom, Inc., (Nov. 1988).
Meridian—Meridian Mail GP Meridian Digital Centrex, preliminary product brochure, Northern Telecom, Inc. (undated).
"AUDIX: Audio Information Exchange", AT&T Information Systems brochure, five pages.

*Primary Examiner*—Thomas W. Brown
*Attorney, Agent, or Firm*—David Volejnicek

[57] ABSTRACT

An adjunct processor (100) is embedded in a telecommunications switching system (10) wherein port circuits (106–108) are interconnected with each other and with a control processor (101) by a TDM bus (105). The adjunct processor is physically incorporated into the switching system, is connected directly to the TDM bus, and communicates with the control processor exclusively via the TDM bus. The adjunct processor is made up of a telecommunications feature module such as a conventional voice-mail system (200), an arrangement (210, 220, 240) for interfacing the feature module to the TDM bus whereby the adjunct processor emulates a port circuit in its connection to the TDM bus, and an arrangement (203) for interfacing the feature module to the control processor whereby the adjunct processor emulates a telephone in its interactions with the control processor.

10 Claims, 14 Drawing Sheets

ADJUNCT PROCESSOR EMBEDDED IN A SWITCHING SYSTEM

TECHNICAL FIELD

The invention relates to switching system-adjunct processors, such as voice-mail systems.

BACKGROUND OF THE INVENTION

Adjunct processors are used in conjunction with telecommunications switching systems to provide to users telecommunications features and services that the switching systems and their intelligence (i.e., their control processors) are not designed to provide. A well-known illustrative example thereof are voice-mail systems. The adjunct processors are interfaced to users through the switching systems, and hence the control processors of the switching systems and the adjunct processors must have a capability of communicating with each other. The communications connections between the switching systems and the adjunct processors are typically accomplished through special control links. Illustrative examples thereof include the SMSI, DCIU, and ASAI links of AT&T PBXs. Consequently, in order for a switching system to be usable with an adjunct processor, it is generally required that the switching system provide and support the special control link.

From a cost standpoint it is desirable to physically incorporate the adjunct processor into the switching system. This eliminates the cost of a separate cabinet for the adjunct processor. It also eliminates the need for long cables and associated circuitry (e.g., amplifiers) for interconnecting the switching system and the adjunct processor. Furthermore, it often allows the adjunct processor to be powered from the power supply of the switching system, thereby eliminating the need for a separate adjunct power supply. An illustrative example of such a physically-incorporated adjunct processor is disclosed in U.S. Pat. No. 4,967,408. The incorporated voice-mail system disclosed therein has the additional advantage that its voice ports connect directly to the internal communications bus of the switching system, thereby eliminating the need for line-interface circuits for the voice-mail system voice-ports. Nevertheless, even when so physically incorporated into the switching system, the adjunct processor requires a special control-link connection to the control processor of the switching system.

Some arrangements for connecting an adjunct processor to a switching system have been proposed that avoid the need for a special control link. An illustrative example thereof is disclosed in U.S. Pat. No. 4,873,718. Therein, a voice-mail system is interfaced to a switching system through a digital feature-telephone set. The feature-telephone set is conventionally connected to the switching system by means of one or more digital telephone lines and digital line-interface circuits. The voice-mail system monitors the display of the feature-telephone set to obtain control information from the switching system, and activates keypad signals on the feature-telephone set to provide control information to the switching system.

Unfortunately, an arrangement of this nature does not facilitate incorporation of the adjunct processor into the switching system. Quite the opposite: it requires a complex interface arrangement comprising a digital line-interface circuit, a digital telephone line, a digital feature-telephone set, and telephone-set display-and keyboard-interface circuitry, to permit the adjunct processor and the control processor of the switching system to communicate with each other. Whatever advantage is gained by elimination of the special control link is offset in large measure by the cost and bulk of this additional interface equipment.

SUMMARY OF THE INVENTION

This invention is directed to solving these and other disadvantages of the prior art. Generally according to the invention, an adjunct processor is embedded in a switching system. That is, the adjunct processor is both physically and logically integrated into the switching system. Physically, it emulates a port circuit (e.g., a telephone line-interface circuit) in its connection to the system's communications medium. Logically, it emulates a telephone set in its interactions with the switching system's control processor. The adjunct processor is thereby able to communicate with the control processor and to carry out its functions without need for special interface circuitry, special control links, or any other special adjunct-processor support—hardware or software—in the switching system other than that which is required by a port circuit.

Specifically according to the invention, there is provided an adjunct processor adapted for embedding in a telecommunications switching system, and also a telecommunications switching system that includes an embedded adjunct processor. The switching system comprises control processing means for controlling operation of the switching system, a communications medium connected to the control processing means, a plurality of port circuits connected to the medium each for interfacing a telephone to the medium and enabling the telephone to communicate with the control processing means via the medium and including a digital port circuit for interfacing a digital display telephone to the medium and enabling the digital display telephone to communicate with the control processing means, and an adjunct processor. The adjunct processor provides a telecommunications feature by communicating with the control processing means both exclusively via the medium and in an identical manner as the digital display telephone. It is connected to the medium directly without intermediacy of a separate port circuit and emulates at least one said digital port circuit in its every connection to the medium. It emulates the digital display telephone in its communications through each of the emulated digital port circuits with the control processing means to provide the telecommunications feature for each of the emulated digital port circuits. An adjunct processor for use as an integral part of such a telecommunications switching system comprises adjunct-feature means for providing a telecommunications feature by exchanging control communications with the control processing means, first emulating means coupled to the adjunct-feature means for connecting the adjunct-feature means to the medium directly without intermediacy of a separate port circuit, by emulating at least one said digital port circuit in every connection of the feature means to the medium, and second emulating means coupled to the adjunct-feature means for communicating with the control processing means on behalf of the adjunct-feature means through the first emulating means exclusively via the medium and in an identical manner as the digital display telephone, by emulating the digital display telephone in its communications through each of the emulated digital port circuits with the control processing means to provide the telecommunications feature for each of the emulated digital port circuits.

Being a digital port circuit from the viewpoint of the switching system's communications medium and a digital display telephone from the viewpoint of the switching system's control processor, the adjunct processor's true identity is transparent to the switching system's translations and call-processing functions. Rather, it is administered as a digital port circuit and a digital display telephone in the translations, and is treated as a digital display telephone by call-processing. By emulating a digital port circuit, the adjunct processor falls under the umbrella of switch maintenance, which increases the integrity of the link between the switch and the adjunct. By emulating a digital port circuit and doing without a separate control communications link, the adjunct processor may be connected to any one of the medium's circuit-pack slots to which digital port circuits are allowed to be connected; it does not require a special slot. Furthermore, by emulating a digital port circuit and a digital display telephone and thus making its true nature transparent to the switching system, the adjunct processor gains regulatory type-acceptance as part of the switching system, and does not require its own, separate, type-acceptance, unlike conventional adjunct processors.

These and other advantages and features of the invention will become apparent from the following description of an illustrative embodiment of the invention considered together with the drawing.

DETAILED DESCRIPTION

Figure 1:
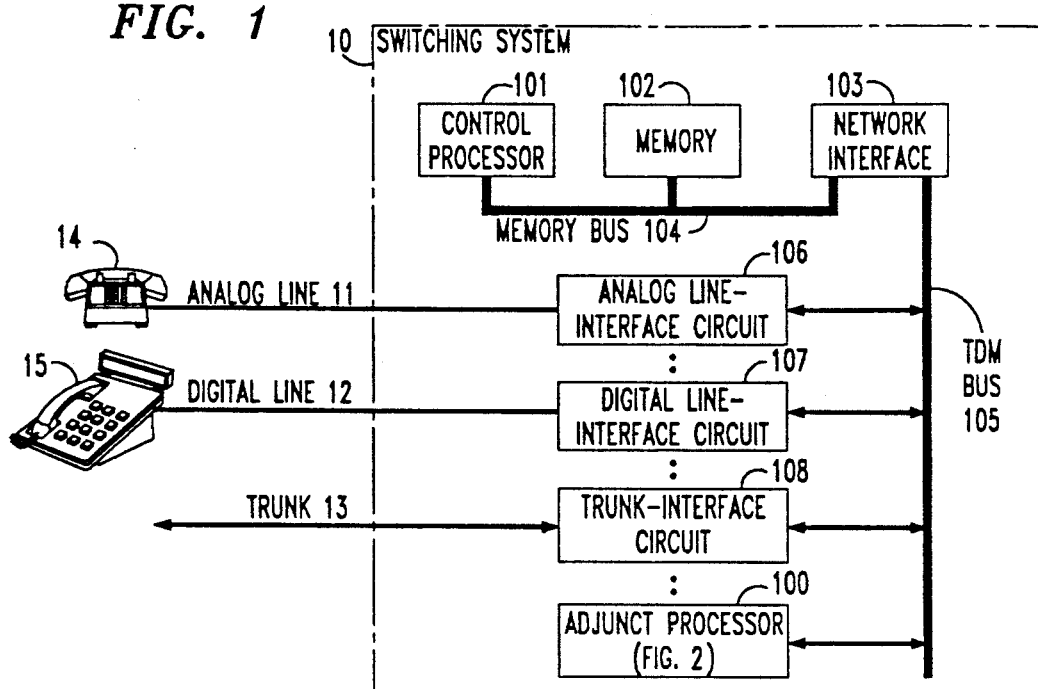
FIG. 1 is a block diagram of a switching system that includes an illustrative embodiment of the invention.

FIG. 1 shows an illustrative switching system 10 which incorporates an illustrative embodiment of the invention 100. Switching system 10 is illustratively the AT&T System 75 or Definity ® G1 PBX. It comprises a control processor 101, a memory 102, and a network interface 103, interconnected by a memory bus 104. Network interface 103 provides processor 101 with access to a time-division multiplexed (TDM) bus 105, which serves as the communications switching medium—the switching fabric—of switching system 10. Control processor 101 controls the operation of switching system 10 and performs telecommunications functions, including call processing and the assignment of time slots of TDM bus 105 for use by individual port circuits and 106-108 and an adjunct processor 100 which are connected to TDM bus 105. To perform its functions, processor 101 communicates with port circuits 106-108, and entities 13-15 connected thereto, via TDM bus 105. Circuits 106-108 include conventional analog line-interface circuits 106 that interface analog telephone lines 11 and analog telephones 14 to TDM bus 105, conventional digital line-interface circuits 107 that interface digital telephone lines 12 and digital telephones 15 to TDM bus 105, and conventional trunk-interface circuits 108 that interface telephony trunks 13 to TDM bus 105. Adjunct processor 100 is constructed according to principles of the invention.

Figure 2:
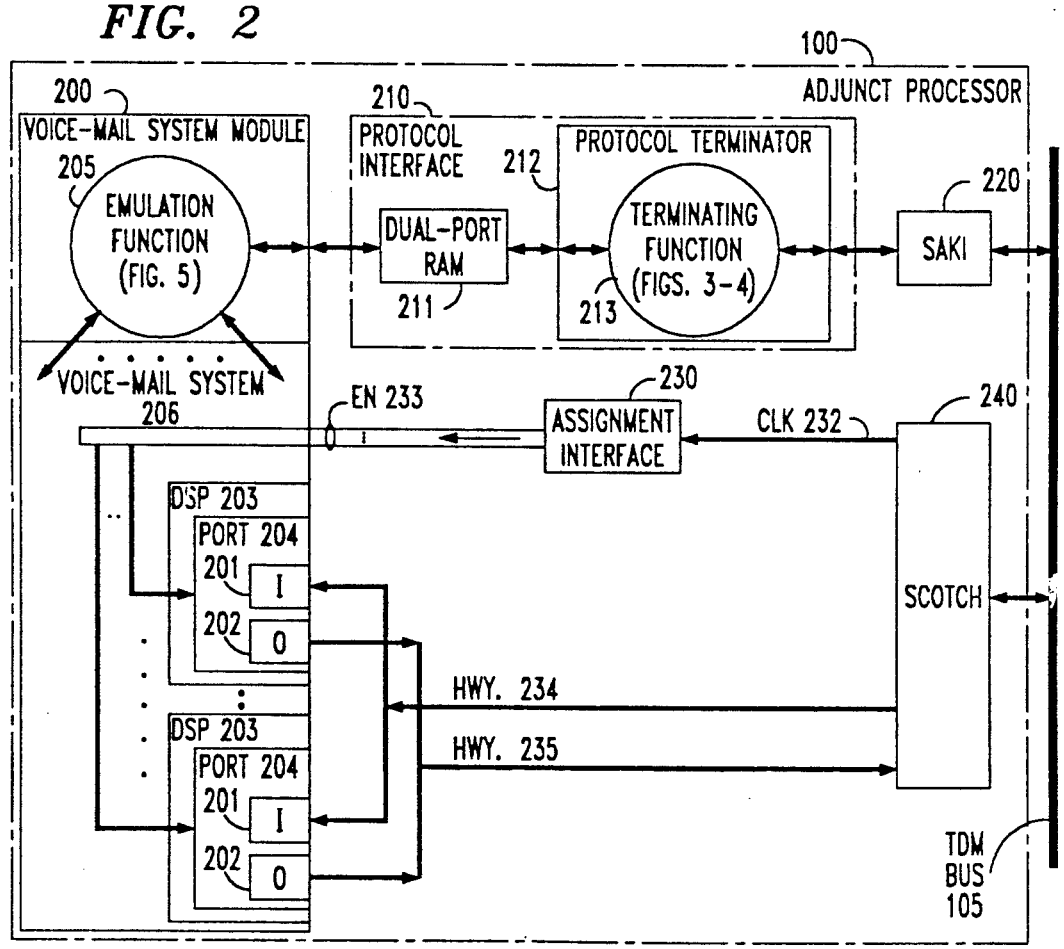
FIG. 2 is a block diagram of the adjunct processor of the switching system of FIG. 1.

Adjunct processor 100 is physically integrated into switching system 10. It is implemented as a circuit pack on a printed-circuit (P.C.) board that plugs into a circuit-pack slot of a carrier whose backplane forms the TDM bus 105. Adjunct processor 100 thus connects directly to TDM bus 105 without the aid of any intervening interface circuitry, such as a separate port circuit and a telephone line. Adjunct processor 100 obtains its operating power from the carrier backplane, same as port circuits 106-108. It also communicates with processor 101 exclusively via TDM bus 105. The configuration of adjunct processor 100 is shown in FIG. 2.

In this illustrative embodiment, adjunct processor 100 serves as a voice-mail system. It illustratively includes a telecommunications-feature module, such as a substantially-conventional voice-mail system module 200, plus interface circuitry that enables adjunct processor 100 to emulate a digital line-interface circuit 108 in its connection to TDM bus 105. Module 200 is illustratively the AT&T Audix ™ voice-mail system. The emulation circuitry includes a sanity and control interface (SAKI) 220, a protocol interface 210, a switch conferencer for TDM bus and concentration highway (SCOTCH) 240, and an assignment interface 230.

SAKI 220 and SCOTCH 240 or their functional equivalents are both conventional circuits which are included in every one of the conventional port circuits 106-108. SAKI 220 communicates control messages to and from control processor 101 over TDM bus 105. It converts standard system 10 control messages to and from the communications protocol of TDM bus 105. SAKI 220 generates an interrupt upon receipt of a message from TDM bus 105, and accepts a message for output to TDM bus 105 in response to receipt of an interrupt. SCOTCH 240 is a concentration/deconcentration device that connects multiple voice and/or data communication channels to TDM bus 105. SCOTCH 240 receives multiple channels for concentration via a first concentration highway 235, and outputs deconcentrated channels onto a second concentration highway 234. Each concentration highway 234, 235 is a conventional passive serial TDM bus that accommodates 32 channels, each having 8 time slots, in each repetitive frame. Between them, SAK1 220 and SCOTCH 240 of adjunct processor 100 present to TDM bus 105 the same appearance as any one of the port circuits 106-108.

Concentration highways 234 and 235 of SCOTCH 240 are coupled to voice ports 204 of voice-mail system module 200 with the aid of assignment interface 230. Each voice port 204 of module 200 is assigned to a digital signal processor (DSP) 203 for processing voice information being received and transmitted at that voice port 204. Illustratively, each DSP 203 handles a plurality of voice ports 204. Each DSP 203 has an input (I) port 201 and an output (0) port 202. Input ports 201 of all DSPs 203 are connected to concentration highway 234, and output ports 202 of all DSPs 203 are connected to concentration highway 235. Each voice port 204 is assigned to a different channel (an 8-bit time-slot) on highway 234 and 235. Hence, module 200 can have up to 32 voice ports 204 in this illustrative implementation, but illustratively has only 8 voice ports 204. If module 200 has fewer than 32 voice ports 204, some channels on highways 234 and 235 are not used. The voice port-to-channel assignment is accomplished by assignment interface 230, in the following manner.

Assignment interface 230 is a cyclical-clock signal generation circuit, of conventional construction. It receives a clock (CLK) input from SCOTCH 240 over lead 232. Each set of eight consecutive CLK signals on lead 232 represents a single time slot on each of the highways 234 and 235. Assignment interface 230 is connected by separate enable (EN) leads 233 to each one of DSPs 203. During each set of eight consecutive CLK signals, assignment interface 230 generates an EN signal on a lead 233 connected to the DSP 203 for the voice port 204 which is assigned to that time slot. The EN signal causes output port 202 of that DSP 203 to unload voice-signal contents from the corresponding voice port 204 onto highway 235, and causes input port 201 of that DSP 203 to load itself with the present voice-signal contents of highway 234 as input for the corresponding voice port 204. Assignment interface 230 generates a sequence of EN signals to DSPs 203 according to assignments programmed into an internal connection table, and then repeats its operation, in an endless cycle.

The control input-and-output port of voice mail system module 200 is coupled to SAKI 220 by protocol interface 210. Protocol interface 210 comprises two parts: a dual-port random-access memory (RAM) 211 and a protocol terminator 212. RAM 211 is a conventional dual-port RAM that provides a buffer for control messages flowing between protocol terminator 212 and module 200. Protocol terminator 212 terminates the control communications protocol used on TDM bus 105. Protocol terminator 212 is illustratively the "angel" processor of an AT&T TN754 digital line-interface circuit 107, performing the terminating function 213 flowcharted in FIGS. 3 and 4.

Figure 3:
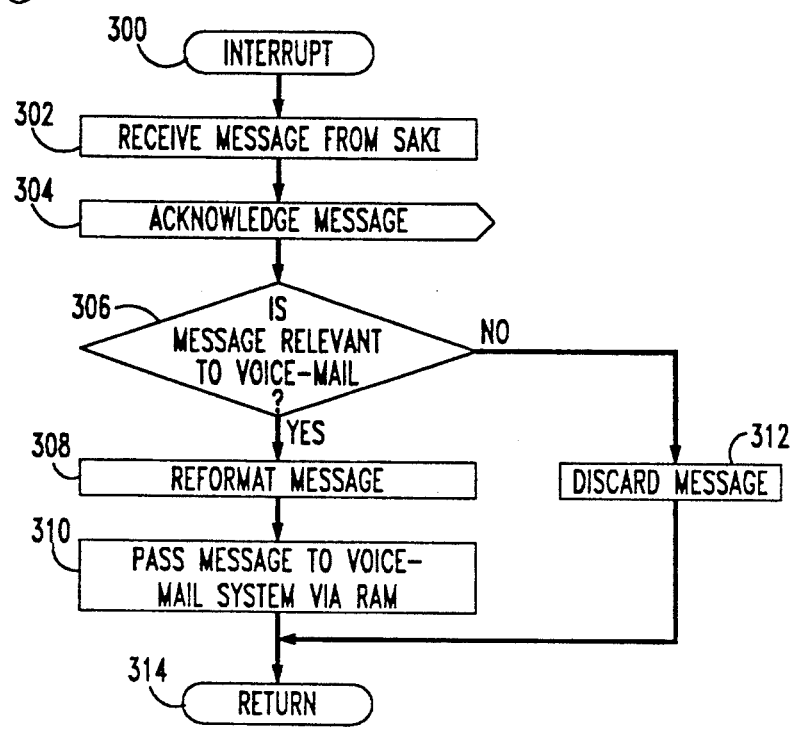
FIGS. 3 and 4 are flow diagrams of the terminating function of the adjunct processor of FIG. 2.

Turning to FIG. 3, it shows the portion of the terminating function 213 provided with respect to control messages flowing from TDM bus 105 to voice-mail system 200. When SAKI 220 receives a message from TDM bus 105 addressed to this slot on the carrier backplane bus, it captures it and issues an interrupt to protocol terminator 212. Receipt of this interrupt, at step 300, activates the function of FIG. 3, and it receives the captured message from SAKI 220, at step 302. The function then sends an acknowledgment of receipt of the message to SAKI 302, at step 304. The function checks the message, at step 306, to determine if it is relevant to the functionality of adjunct processor 100. In this illustrative example, the function checks whether the message is relevant to voice-mail. If not, the function discards the message, at step 312, and then returns to the point of its invocation, at step 314. If the message is relevant to voice-mail, the function converts it from the format in which it was received into the format used by module 200, at step 308. The function then passes the reformatted message to module 200 through dual-port RAM 211, at step 310, using any standard dual-port RAM communications protocol. The function then returns, at step 314.

Figure 4:
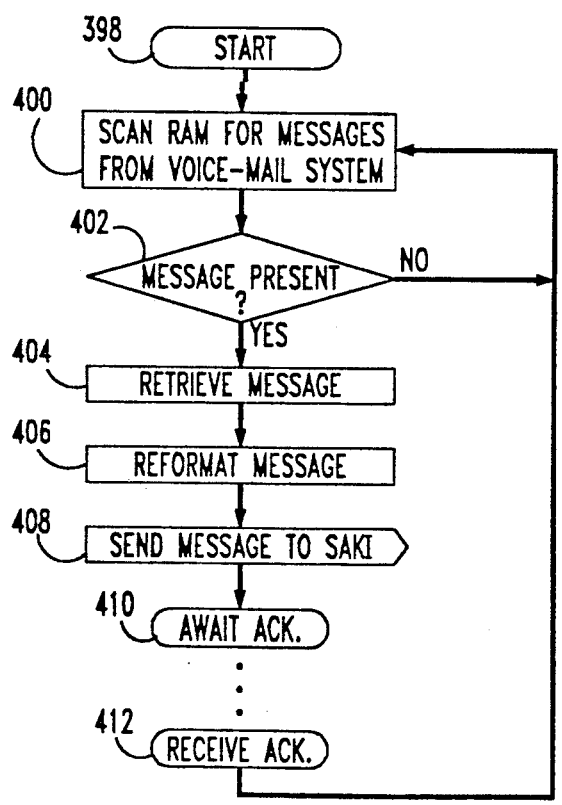

FIG. 4 shows the portion of the terminating function 213 provided with respect to control messages flowing from voice-mail system 200 to TDM bus 105. Upon its start-up, at step 398, the function scans dual-port RAM 211 for presence therein of a message from module 200, at step 400. If a message is not found, as determined at step 402, the function merely returns to step 400 to repeat the scan. If a message is found, as determined at step 402, the function retrieves the message from dual-port RAM 211, at step 404. The function then converts the retrieved message from the format in which it was received into the format used by SAKI 220, at step 406, and sends the reformatted message to SAKI 220, at step 408. Step 408 enables SAKI 220 to send the data at the appropriate time slots on TDM bus 105. The function then awaits a response from SAKI 220 acknowledging that the message was sent on TDM bus 105, at step 410. Following receipt of the acknowledgment, at step 412, the function returns to step 400 to scan RAM 211 for more messages.

In addition to its conventional functions, voice-mail system module 200 includes and executes a new emulation function 205. In this illustrative embodiment, function 205 emulates a control link to module 200 in terms of the control communications that it carries on with other entities of module 200. More importantly, however, function 205 communicates with processor 101 on behalf of module 200 and emulates one or more digital display telephones in terms of the control communications that it carries on with processor 101 via TDM bus 105. In this illustrative example, function 205 emulates eight AT&T 7405 digital display telephones, one for each port 204. Consequently, each port 204 is administered as a 7405D telephone in the administration database (stored in memory 102) of switching system 10. For purposes of this discussion, the following are important characteristics of a 7405D telephone and the manner in which it is administered. It has a display with the following buttons associated therewith: normal, date-time, directory, next. It is a single-line (i.e. a single-port) telephone set having 10 call appearance buttons. Nine call appearances correspond to the port's extension number, and the tenth call appearance is bridged to the extension of another one of the eight emulated phones. The tenth call appearance of each one of the emulated phones is bridged to this same extension. All emulated phones are assigned to a common uniform-call-distribution hunt group. Each call appearance has two indictor lamps associated therewith: an in-use lamp, and a status lamp. The telephone further has a 12-button digit keypad (including # and *), and four feature buttons: transfer, lwc-store, lwc-cancel, and aux-work (also known as make-busy). The latter three buttons each have an associated indicator lamp.

Figure 5:
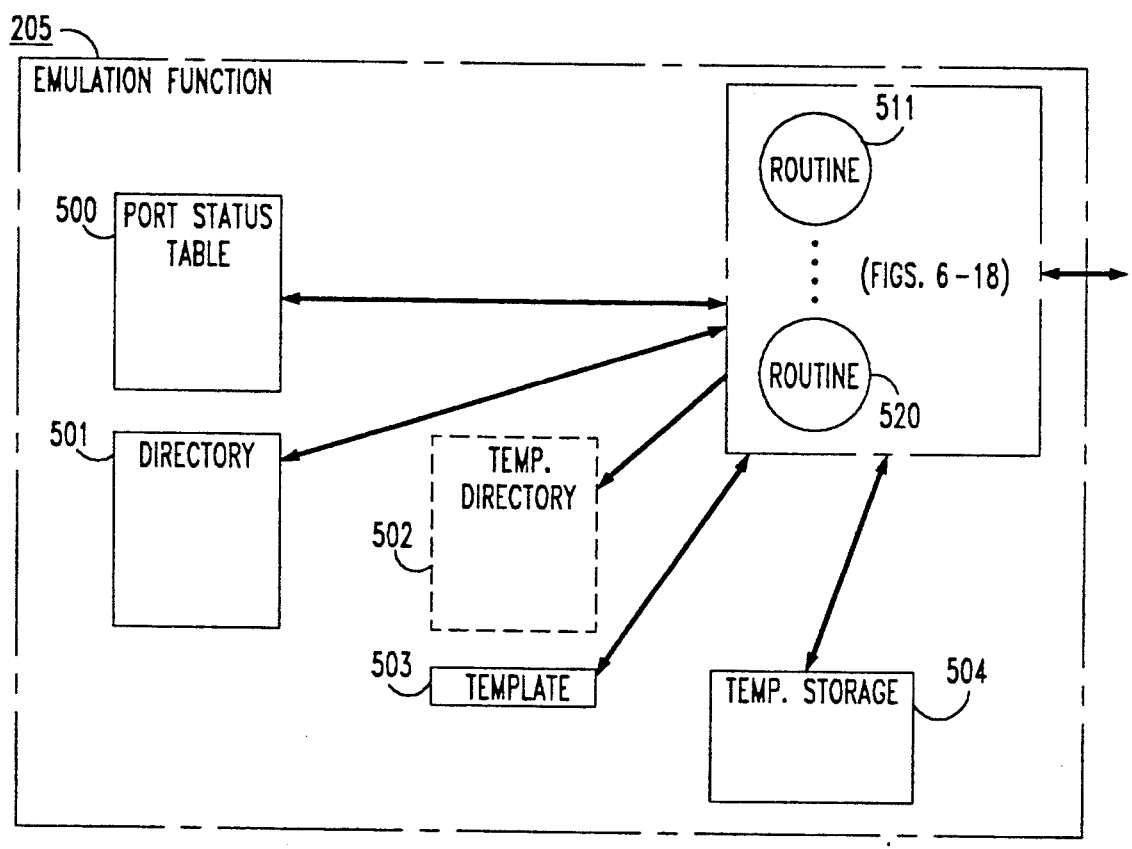
FIG. 5 is a block diagram of the emulation function of the adjunct processor of FIG. 2.

Emulation function 205 is shown in FIG. 5. It comprises a plurality of data structures 500–504 and a plurality of routines 511–520. Port status table 500 serves to store the status of each voice-mail system port 204, i.e., of each emulated telephone corresponding to ports 204. It stores the lamp status of each indicator lamp of every call appearance button and feature button, the functional status of the ports 204 themselves, and some additional information that will become clear from the discussion below. Directory 501 stores names and corresponding extensions of all administered ports on TDM bus 105. Temporary directory 502 has occasional transitory existence for updating directory information, as will be made clear below. Furthermore, there is a template 503 storage area and a general temporary storage 504, whose use will be explained below. Data structures 500–504 are used by routines 511–520. Routines 511–520—also referred to as processes when executing—are flowcharted in FIGS. 6–18.

Figure 6:
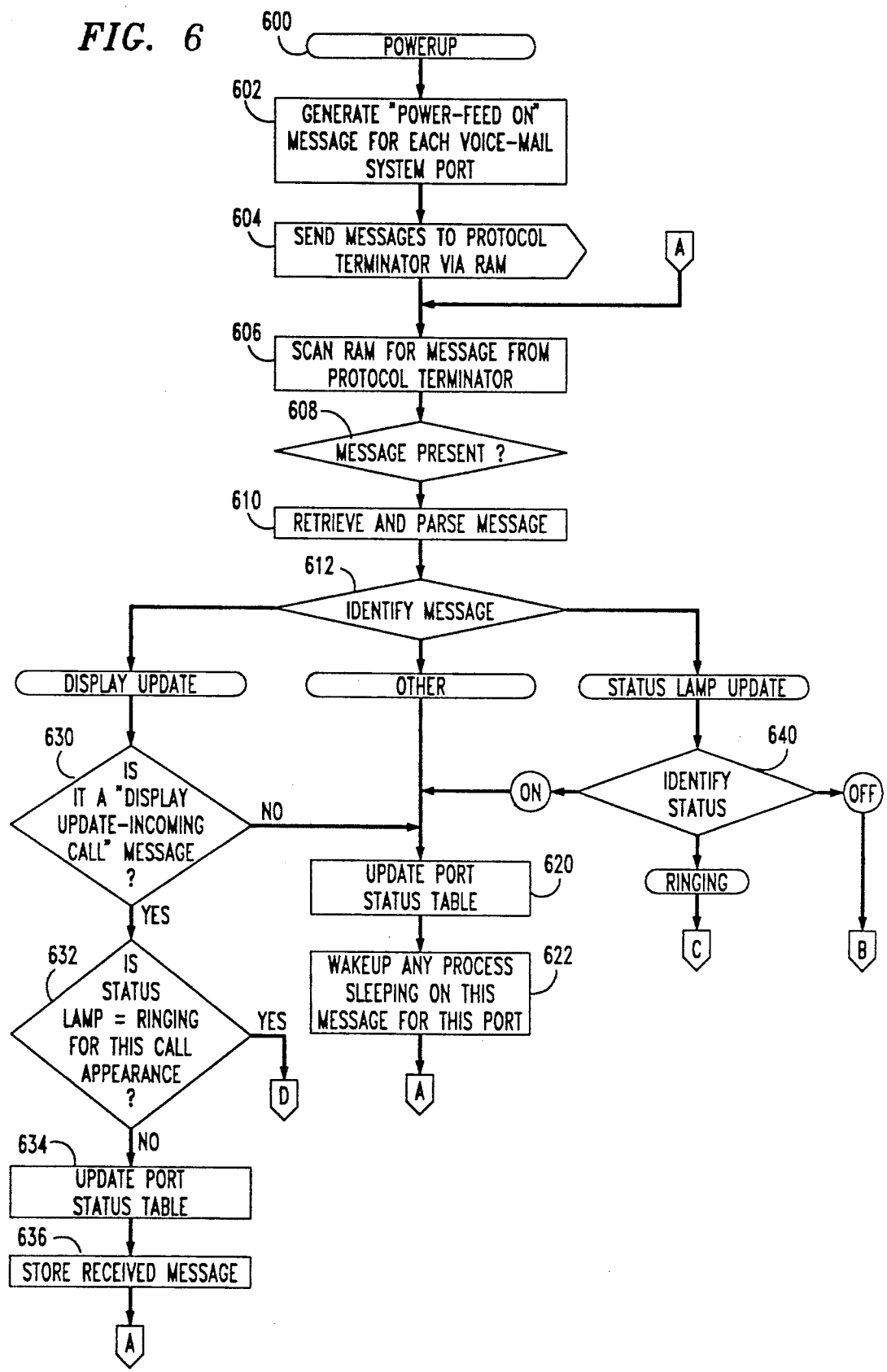
FIGS. 6-18 are flow diagrams of routines of the emulation function of FIG. 5.
Figure 7:
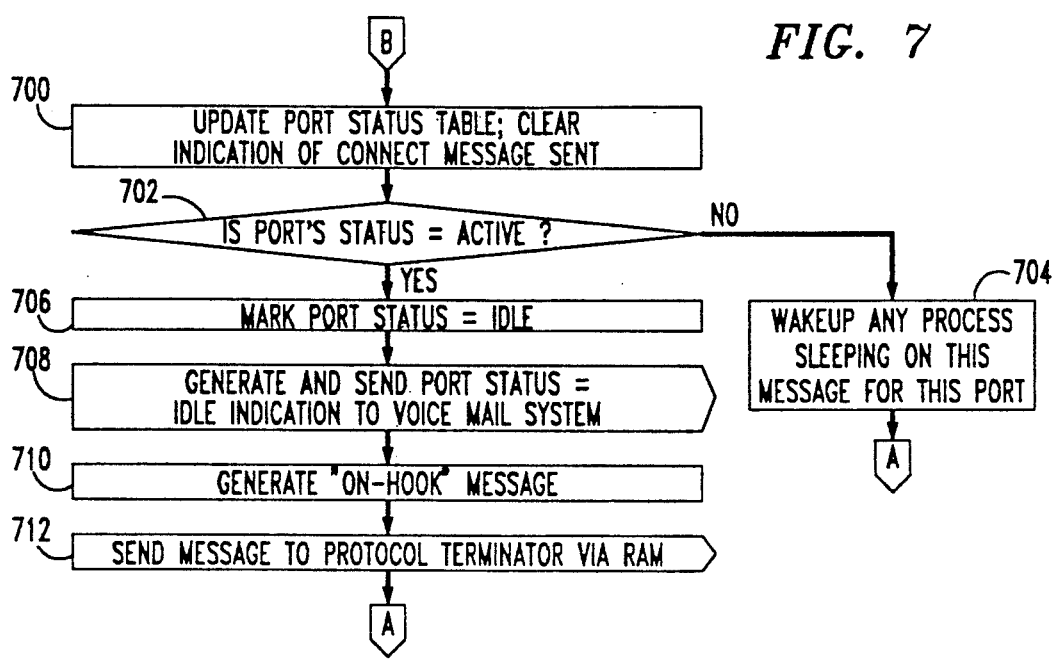
Figure 8:
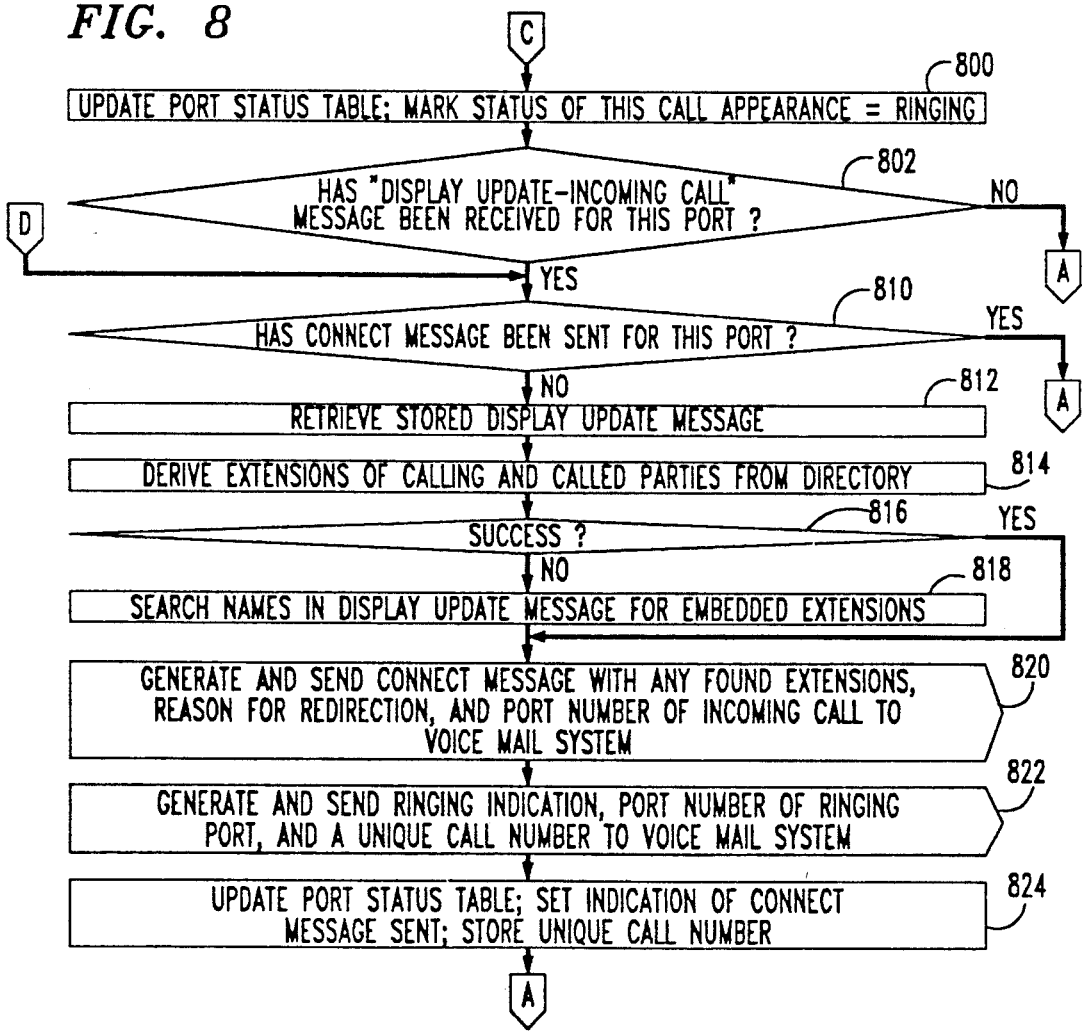

An input-message handling routine is flowcharted in FIGS. 6–8. It handles messages received from control processor 101 of switching system 10. As shown in FIG. 6, upon power-up of adjunct processor 100, at step 600, the routine generates a "power-feed on" message for each port 204 of voice-mail system 200, at step 602, and sends the generated messages to processor 101 by passing the messages to protocol terminator function 213 through dual-port RAM 211, at step 604. These messages indicate to processor 101 that "telephones" have been connected to ports 204, and cause processor 101 to send calls to, and to reply to stimulus from, these "telephones". The function then scans dual-port RAM 211 for messages from processor 101 received and passed through by terminator function 213, at step 606. If a message is found, at step 608, the function retrieves the message from RAM 211 and parses it to determine its meaning and content, at step 610.

If the received message is identified, at step 612, as any message other than a "display update" or a "status lamp update" message, the function merely updates port status table 500 to indicate receipt of the message, at step 620, and wakes up any process sleeping on (i.e., awaiting receipt of) this message, at step 622. The function then returns to step 606 to continue scanning RAM 211 for more messages.

If the received message is identified, at step 612, as a "display update" message, the function determines whether it is a "display update-incoming call" message, at step 630, indicating that a new call is incoming at a port 204 and a call appearance identified by that message. Illustratively, this message is distinguished from other "display update" messages by having the word "to" between the names of a calling and a called party. If the message is not an "incoming call" message, the function merely proceed to steps 620 et seq. If the message is an "incoming call" message, the function checks status table 500 to determine whether the status of the call appearance on which the call is incoming is "ringing", that is, whether the status lamp status is "flashing at a ringing rate" for that call appearance, at step 632. If not, the function updates port status table 620 to indicate receipt of this message, at step 634, stores the message in temporary storage 504, at step 636, and then returns to step 606. If the checked call appearance is determined at step 632 to have a "ringing" status, the function checks an indicator associated with this port 204 in table 500 to determine if a "connect" message has already been sent to voice-mail system 200 for this port 204, at step 810 of FIG. 8. If so, the function merely returns to step 606; if not, the function retrieves from temporary storage 504 the "display update-incoming call" message that will have been stored at step 634, at step 812.

The function then uses the calling and called party names contained within the retrieved message to find their corresponding extension numbers in directory 501, at step 814. If the function does not succeed in finding both extension numbers, as determined at step 816, it searches the contents of the retrieved message for extension numbers embedded in the parties' names, at step 818. Following step 818, or if the function does succeed in finding both extension numbers at steps 814 and 816, the function uses the contents of the retrieved message to generate and send a "connect" message to voice-mail system 200, at step 820. The "connect" message is illustratively a conventional SMSI protocol "connect" message, and contains any found extension numbers, a reason for redirection of the call to voice-mail system 200, and an identification of port 204 on which the call is incoming. The function further generates and sends a ringing indication to voice-mail system 200 along with the identification of port 204 on which the call is incoming, and a unique call identifier generated by the function, at step 822. The function then updates the status in table 500 of port 204 on which the call is incoming, at step 824. This includes setting an indication that a "connect" message has been sent for this port 204, and storing the unique call identifier that was generated at step 822. The function then returns to step 606.

Returning to step 612 of FIG. 6, if the function determines there that the received message is a "status lamp update" message, it identifies the new status being reported, at step 640. If the new status is "on", the function merely proceeds to step 620. If the new status is "off", the function updates contents of status table 500 to indicate receipt of the message, and also clears the indication in table 500 for the corresponding port 204 which indicates whether or not a "connect" message has been sent for this port 204 to voice-mail system 200, at step 700 of FIG. 7. The function then checks whether the status of the subject port 204 in table 500 is "active", i.e., whether that port 204 has an active call thereon, at step 702. If not, the function merely wakes up any processes that are sleeping on the received message, at step 704, and then returns to step 606. But if the port 204 status is "active", the function changes the port 204 status in table 500 to "idle", at step 706, and generates and sends an indication of this new port status to voice-mail system 200, at step 708. The function then generates an "on-hook" message, at step 710, sends it to processor 101 via protocol interface 210, at step 712, and then returns to step 606.

Returning to step 640, if the status reported by the received "status lamp update" message is "ringing", the function updates table 500 to indicate receipt of the message and changes the status of the message's corresponding call appearance to "ringing", at step 800 of FIG. 8. The function then checks contents of table 500 to determine if a "display update—incoming call" message has been received for the corresponding port 204, at step 802. If not, the function returns to step 606; if so, the function proceeds to steps 810 et seq., described above.

Figure 9:
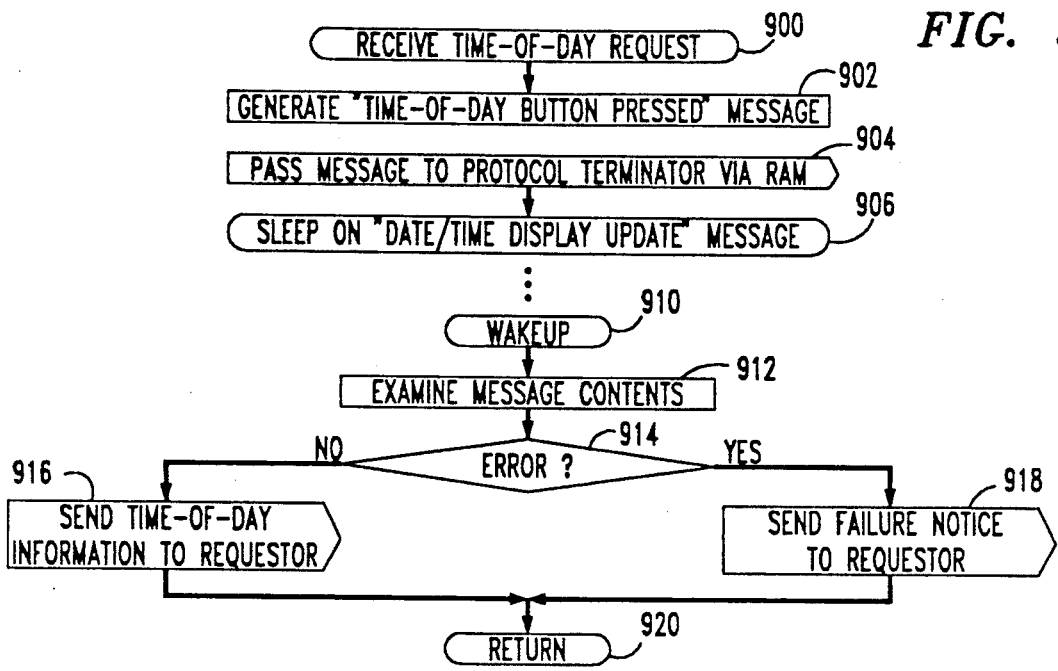

The execution of the remaining routines of emulation function 205, shown in FIGS. 9–18, is invoked by receipt of different requests from other parts of voice-mail system 200. FIG. 9 shows a function invoked by receipt of a time-of-day request, at step 900. In response, the function generates a "time-of-day button pressed" message, at step 902 and sends it to processor 101 via protocol interface 210, at step 904. The function then goes to sleep to await receipt of a "date/time display update" message at step 906. As discussed in conjunction with steps 630, 620, and 622, receipt of the awaited message results in the function being awakened, at step 910. The function then examines the contents of the received message, at step 912, to determine if they report an error, at step 914. If, so, the function sends a "failure" notice to the requester of the time-of-day, at step 918; if not, the function sends to the requester the time-of-day information reported by the received message, at step 916. The function the returns to the point of its invocation, at step 920.

Figure 10:
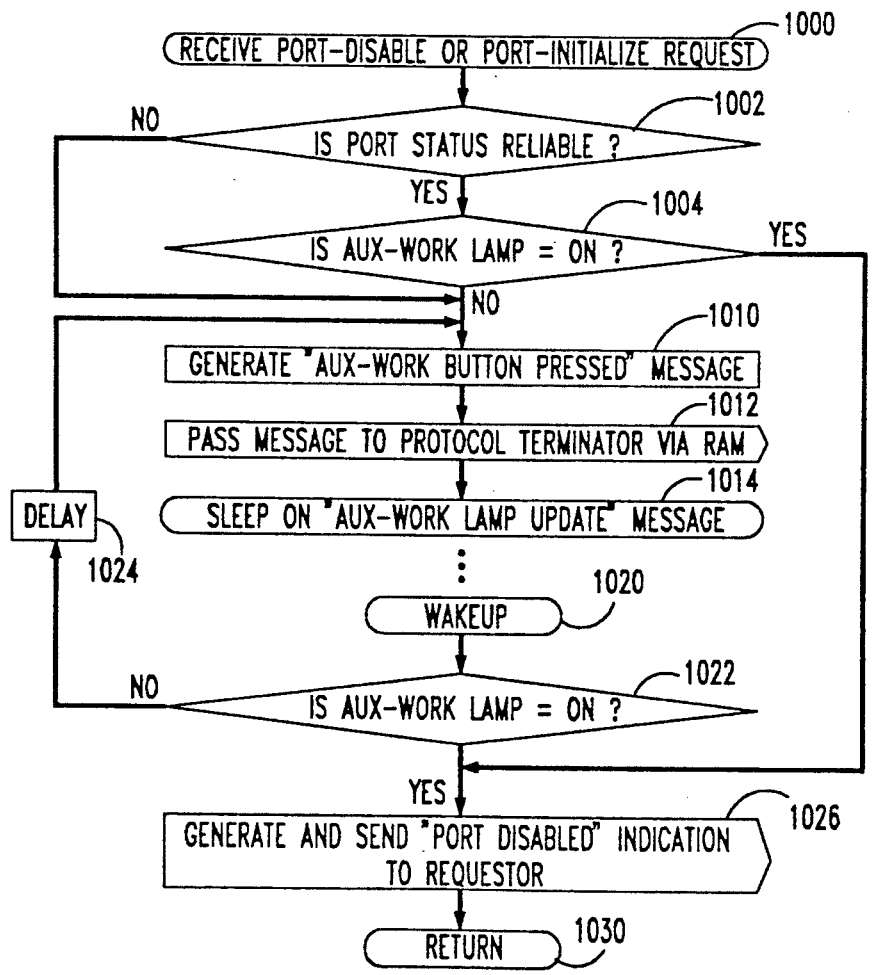

FIG. 10 shows a function invoked by receipt of either a port-disable request or a port-initialize request, at step 1000. In response, the function checks contents of table 500 for that port 204 to determine if the port's status is reliable, at step 1002. Illustratively, this involves checking whether an "aux-work lamp update" message has been received for this port 204 since power-up of adjunct processor 100: if so, the status is considered reliable. If port status is determined to be reliable at step 1002, the function checks contents of table 500 for whether that port's aux-work lamp status is indicated to be "on", at step 1004. If so, the function generates and sends a "port disabled" indication to the entity that made the request at step 1000, at step 1026, and then returns to the point of its invocation, at step 1030.

If port status is found to be unreliable at step 1002, or if the port's aux-work lamp status is not indicated to be "on" (i.e., port status is "off"), at step 1004, the function generates an "aux-work button pressed" message for this port 204, at step 1010, and sends it to processor 101 via protocol interface 210, at step 1012. The function then sleeps, awaiting receipt of an "aux-work lamp update" message from processor 101 for this port 204, at step 1014. Upon receipt of the awaited message, the function is awakened, at step 1020, as explained in conjunction with steps 620-622 of FIG. 6. The function checks the received message for whether it reports aux-work lamp status of "on", at step 1022. If not, the function delays for one second, at step 1024, to give a chance to all messages from processor 101 to be delivered and all port status to settle, and then returns to step 1010 to try again. If the reported aux-work lamp status is determined at step 1022 to be "on", the function generates and sends a "port disabled" indication to the entity that placed the request at step 1000, at step 1026. The function then returns to the point of its invocation, at step 1030.

Figure 11:
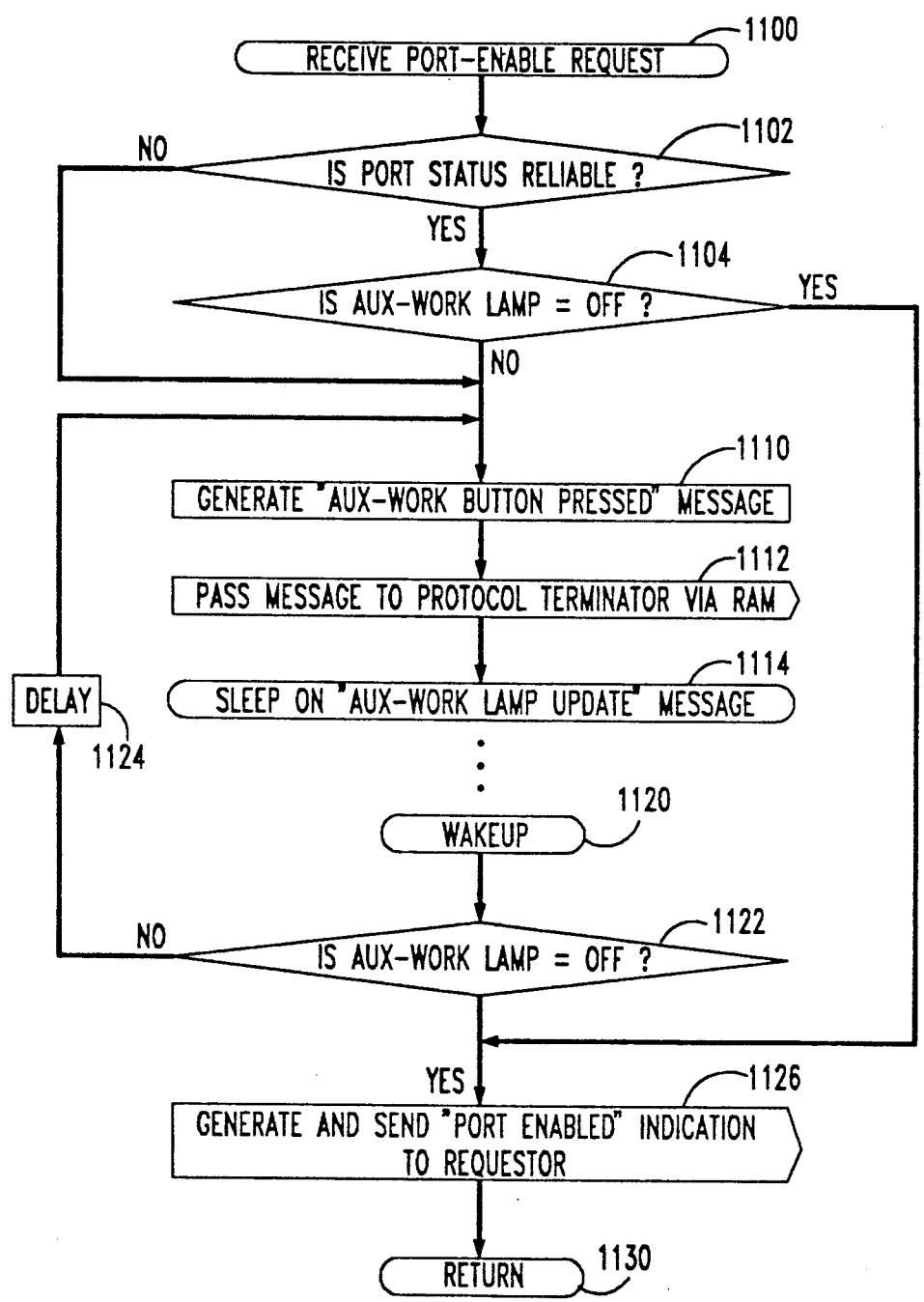

FIG. 11 shows a function invoked by receipt of a port-enable request, at step 1100. In response, the function checks whether the subject port's status is reliable, at step 1102, in the same manner as at step 1002 of FIG. 10. If the port status is reliable, the function checks contents of table 500 for whether that port's aux-work lamp status is indicated to be "off" (i.e., port status is "on"), at step 1104. If so, the function generates and sends a "port enabled" indication to the entity that made the request at step 1100, at step 1126, and then returns, at step 1130.

If port status is found to be unreliable at step 1102, or if the port's aux-work lamp status is not indicated to be "off" at step 1104, the function generates an "aux-work button pressed" message for this port 204, at step 1110, and sends it to processor 101 via protocol interface 210, at step 1112. The function then sleeps, awaiting receipt of an "aux-work lamp update" message from processor 101 for this port 204, at step 1114. Upon receipt of the waited message, the function is awakened, at step 1120, as explained in conjunction with steps 620-622 of FIG. 6. The function checks the received message for whether it reports aux-work lamp status of "off", at step 1122. If not, the function delays for one second, at step 1124, and then returns to step 1110 to try again. If the aux-work lamp status is determined at step 1122 to be "off", the function generates and sends a "port enabled" indication to the entity that placed the request at step 1100, at step 1126. The function then returns, at step 1130.

Figure 12:
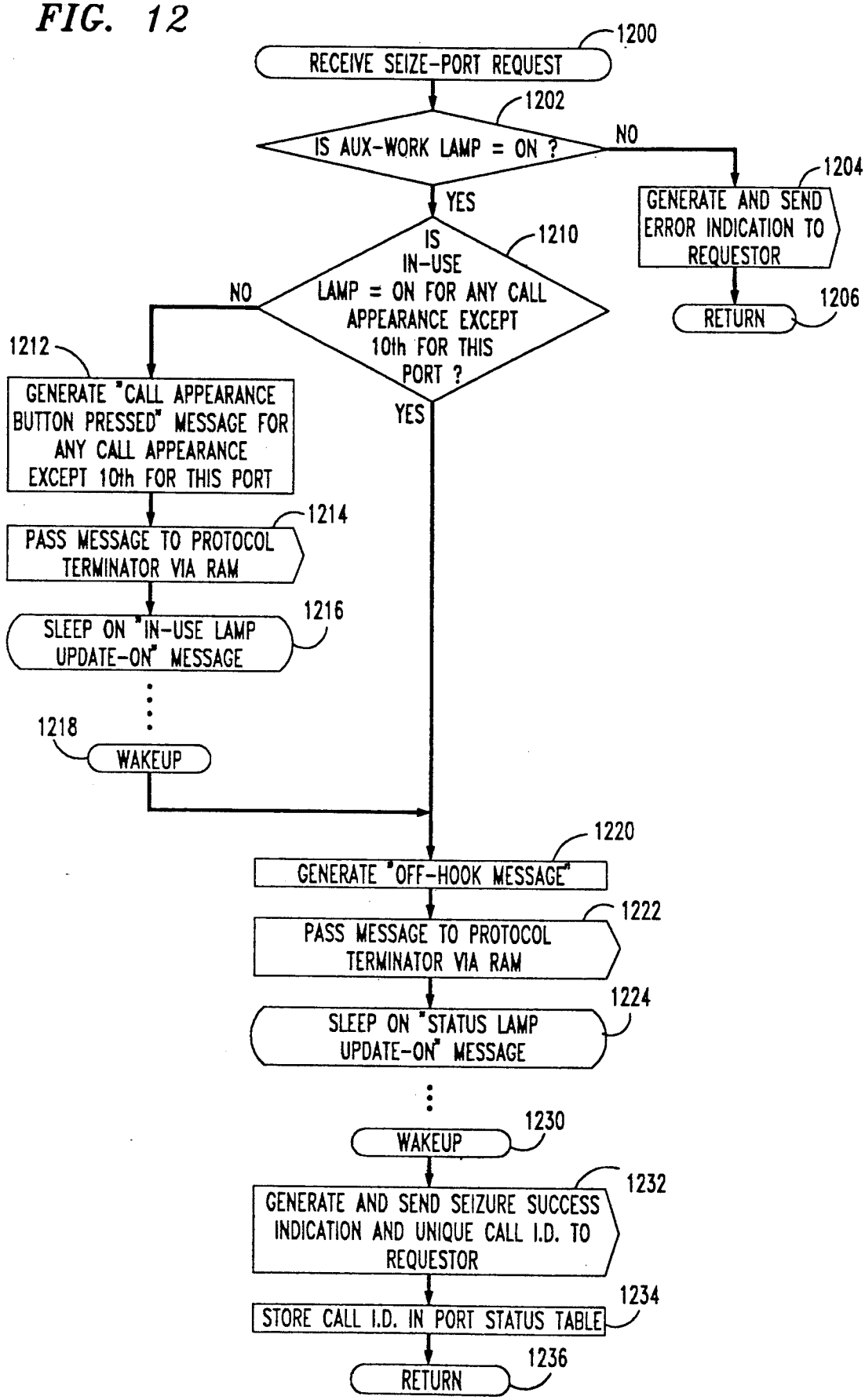

FIG. 12 shows a function invoked by receipt of a seize-port request, for an outgoing call, at step 1200. In response, the function checks the port's aux-work lamp status in table 500 to determine if it is "on" (i.e., port status is "busy"), at step 1202. If the port's aux-work lamp status is not "on", the port cannot be seized, and the function generates and sends an "error" indication to the requester of the seizure, at step 1204. The function then returns to the point of its invocation, at step 1206.

If the port's aux-work lamp status is determined at step 1202 to be "on", the function checks contents of table 500 to determine if in-use lamp status is "on" for any call appearance of this port 204 except for the bridged 10th call appearance, at step 1210. If not, the function generates a "call appearance button pressed" message for any call appearance of this port 204 except for the 10th one, at step 1212, and sends the message to processor 101 via protocol interface 210, at step 1214. The function then goes to sleep to await receipt of an "in-use lamp update-on" message from processor 101 for this port 204, at step 1216. Upon receipt of the awaited message, the function is awakened, at step 1218, as explained at steps 620-622 of FIG. 6.

Following step 1218, or if the in-use lamp status of a call appearance of the subject port 204 is found to be "on" at step 1210, the function generates an "off-hook" message, at step 1220, and sends it to processor 101 via protocol interface 210, at step 1222. The function then sleeps and waits for receipt of a "status lamp update-on" message from processor 101, at step 1224. Upon receipt of the awaited message, the function is awakened, at step 1230, as explained at steps 640 and 620-622 of FIG. 6, at step 1230. In response, the function generates and sends a "seizure success" indication and a unique call I.D. to the entity that placed the seizure request at step 1200 at step 1232. The function then stores this call I.D. for the subject port 204 in table 500, at step 1234, and returns, at step 1236.

Figure 13:
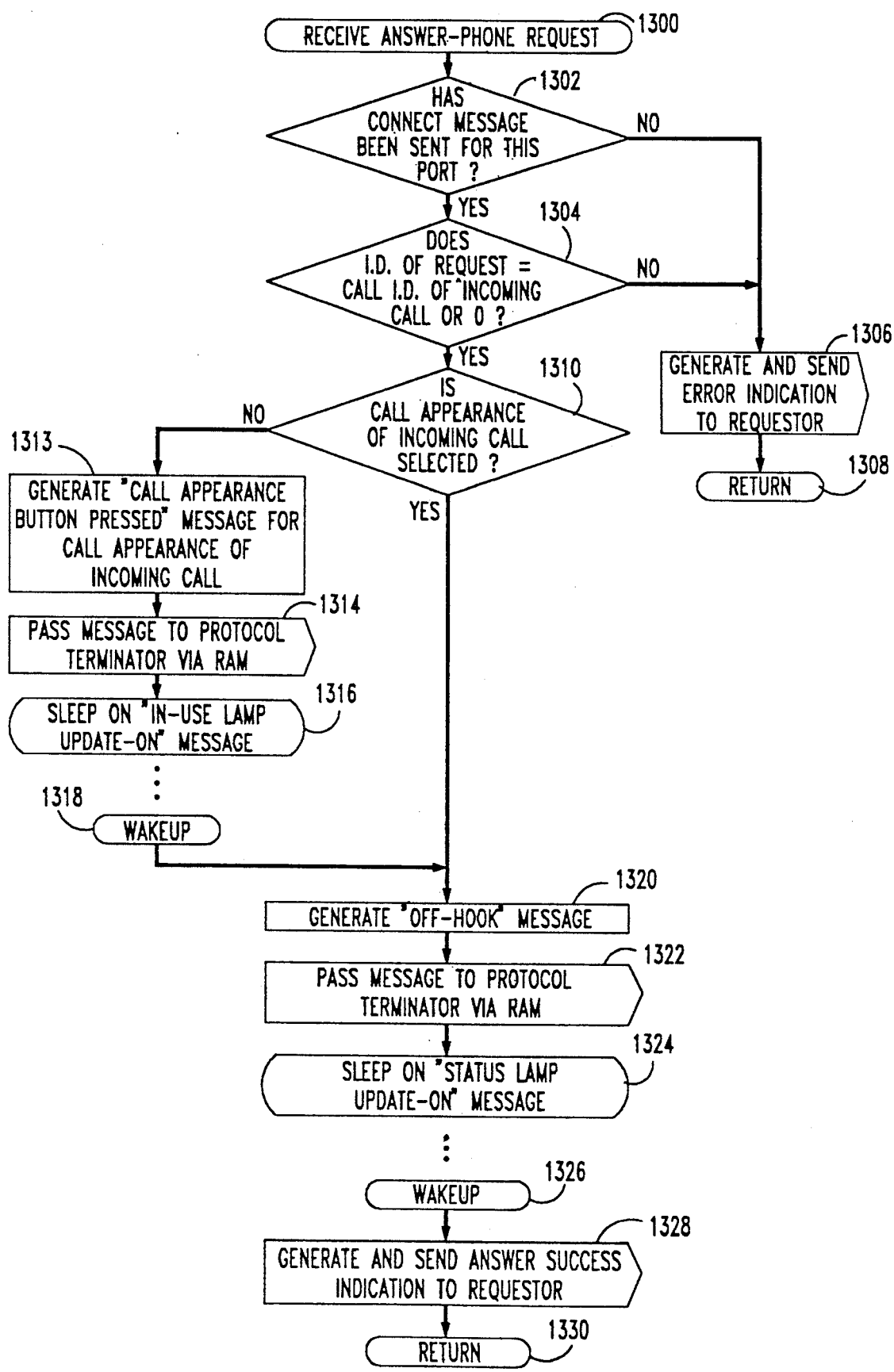

FIG. 13 shows a function invoked by receipt of an answer-phone request, at step 1300. The request specifies the incoming port 204 and call appearance of the call, and the call I.D. In response, the function checks the port's status in table 500 to determine whether a "connect" message has been sent to system 200 for this port 204, at step 1302. If not, the function sends an "error" indication to the requester, at step 1306, and returns, at step 1308. If it is determined at step 1302 that a "connect" message has been sent for this port 204, the function checks whether the call I.D. received in the request matches the call I.D. stored for the port 204 in table 500 or is null, at step 1304. If the result of the check at step 1304 is negative, the function proceeds to step 1306; if the result is affirmative, the function checks whether the call appearance on which the call is incoming is selected, at step 1310. This check involves determining from contents of table 500 whether that call appearance's associated in-use lamp is indicated to be "on steady". If not, the function generates a "call appearance button pressed" message for the call appearance on which the call is incoming, at step 1312, and sends it to processor 101 via protocol interface 210, at step 1314. The function then sleeps, awaiting receipt of an "in-use lamp update-on" message for the call appearance of the incoming call, at step 1316. Upon receipt of the awaited message, the function is awakened, at step 1318, as described for steps 620-622 of FIG. 6.

Following step 1318, or if the check at step 1310 indicates that the call appearance of the incoming call is selected, the function generates an "off-hook" message, at step 1320, and sends it to processor 101 via protocol interface 210, at step 1322. The function then goes to sleep to await receipt of a "status lamp update-on" message for the call appearance of the incoming call, at step 1324. Upon receipt of the awaited message, the function is awakened, at step 1326. It then generates and sends a "call-answer success" indication to the entity that placed the request in step 1300, at step 1328. The function then returns, at step 1330.

Figure 14:
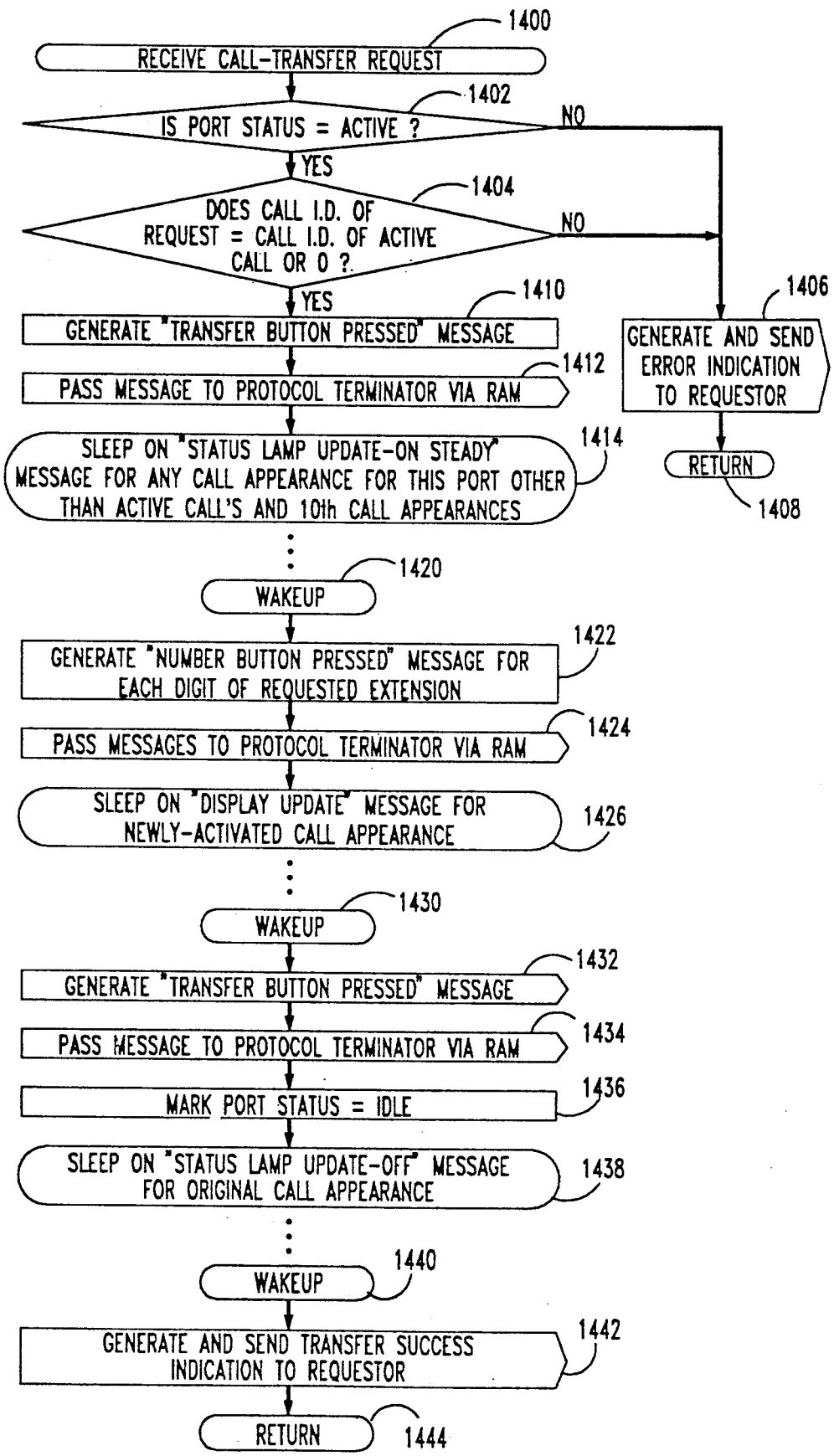

FIG. 14 shows a function invoked by receipt of a call-transfer request, at step 1400. In response, the function checks the call port's status in table 500 to determine if the port has an active call thereon, at step 1402. If the port status is not "active", the function generates and sends an "error" indication to the requester, at step 1406, and then returns, at step 1408. If the port status is determined to be "active" at step 1402, the function checks whether the call I.D. received in the request matches the call I.D. stored for the call's port 204 in table 500 or is null, at step 1404. If the result of the check at step 1404 is negative, the function proceeds to step 1406. If the result is affirmative, the function generates a "transfer button pressed" message, at step 1410, and sends it to processor 101 via protocol interface 210, at step 1412. The function then goes to sleep to await receipt of a "status lamp update-on steady" message for any call appearance of the call's port 204 other than the call's active call appearance and the bridged 10th call appearance, at step 1414.

Upon receipt of the awaited message, the function is awakened, at step 1420. It then generates "number button pressed" messages, one for each digit of the extension to which the call is being transferred, at step 1422, and sends these messages to processor 101 via protocol interface 210, at step 1424. The function then returns to sleep to await receipt of a "display update" message for the call appearance whose activation was signaled by the message received at step 1420, at step 1426.

When the awaited message is received, the function is awakened, at step 1430, and it generates another "transfer button pressed message", at step 1432, which it sends to processor 101 via protocol interface 210, at step 1434. The function also marks the status of the call's original port 204 as "idle" in table 500, at step 1436. Then the function again goes to sleep, this time to await receipt of a "status lamp update-off" message for the call appearance on which the call originally appeared, at step 1438. Receipt of the awaited message results in awakening of the function, at step 1440, in the manner described for steps 700-704 of FIG. 7. In response, the function generates a "transfer success" indication and sends it to the entity that placed the call-transfer request at step 1400, at step 1442. The function then returns, at step 1444.

Figure 15:
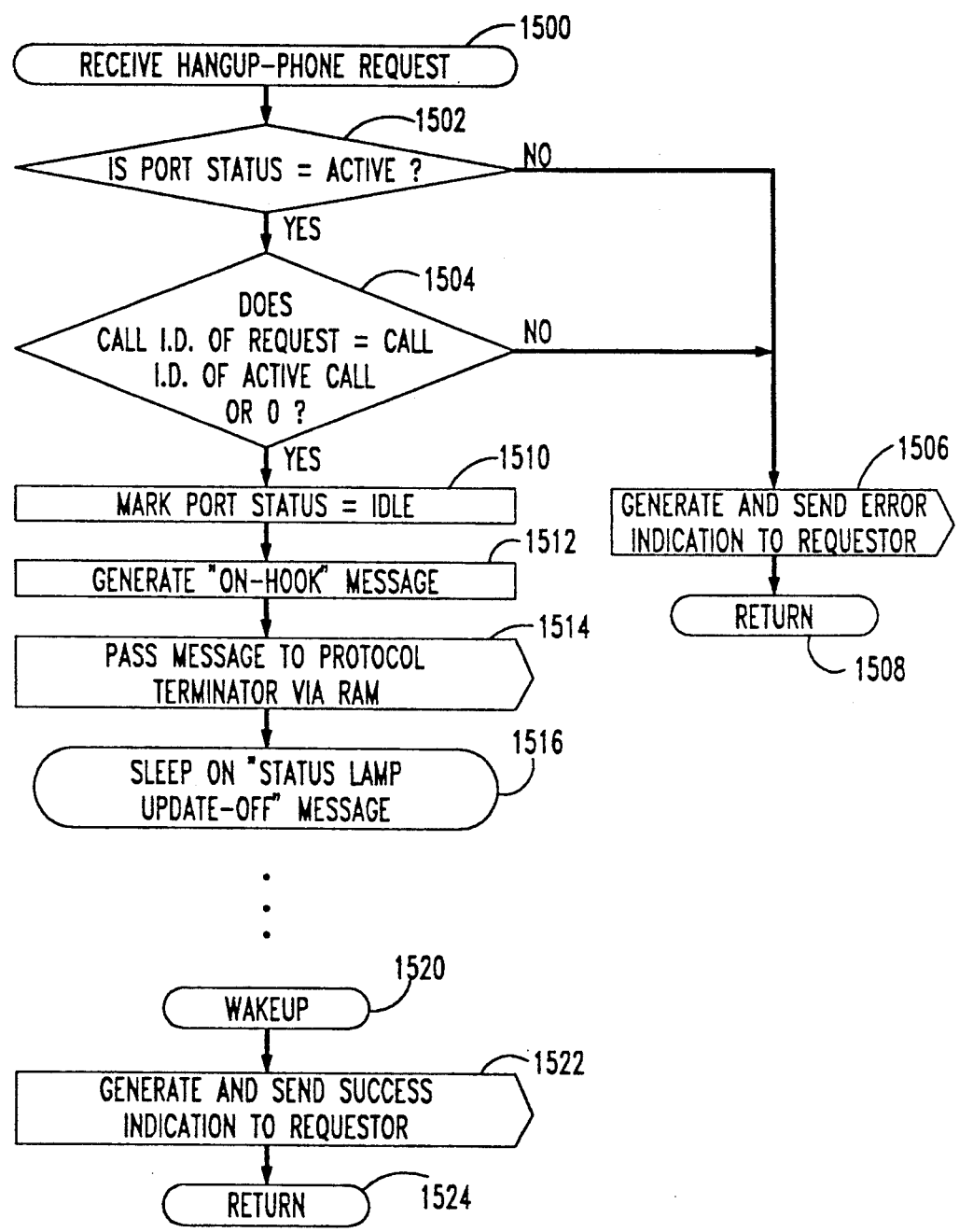

FIG. 15 shows a function invoked by receipt of a hangup-phone request, at step 1500. In response, the function checks the port's status in table 500 to determine if the port has an active call thereon, at step 1502. If the port status is not "active", the function generates and sends an "error" indication to the requester, at step 1506, and then returns, at step 1508. If the port status is determined to be "active" at step 1502, the function checks whether the call I.D. received in the request matches the call I.D. stored for the call's port 204 in table 500 or is null, at step 1504. If the result of the check at step 1504 is negative, the function proceeds to step 1506; if the result is affirmative, the function marks the status of the subject port 204 as "idle" in table 500, at step 1510. The function then generates an "on-hook" message, at step 1512, sends it to processor 101 via protocol interface 210, at step 1514, and then sleeps waiting for receipt of a "status lamp update-off" message for the subject port 204, at step 1516.

Receipt of the awaited message results in waking up of the function, at step 1520, in the manner described for steps 700-704 of FIG. 7. In response, the function generates a "hangup success" indication and sends it to the entity that placed the hangup request at step 1500, at step 1522. The function then returns, at step 1524.

Figure 16:
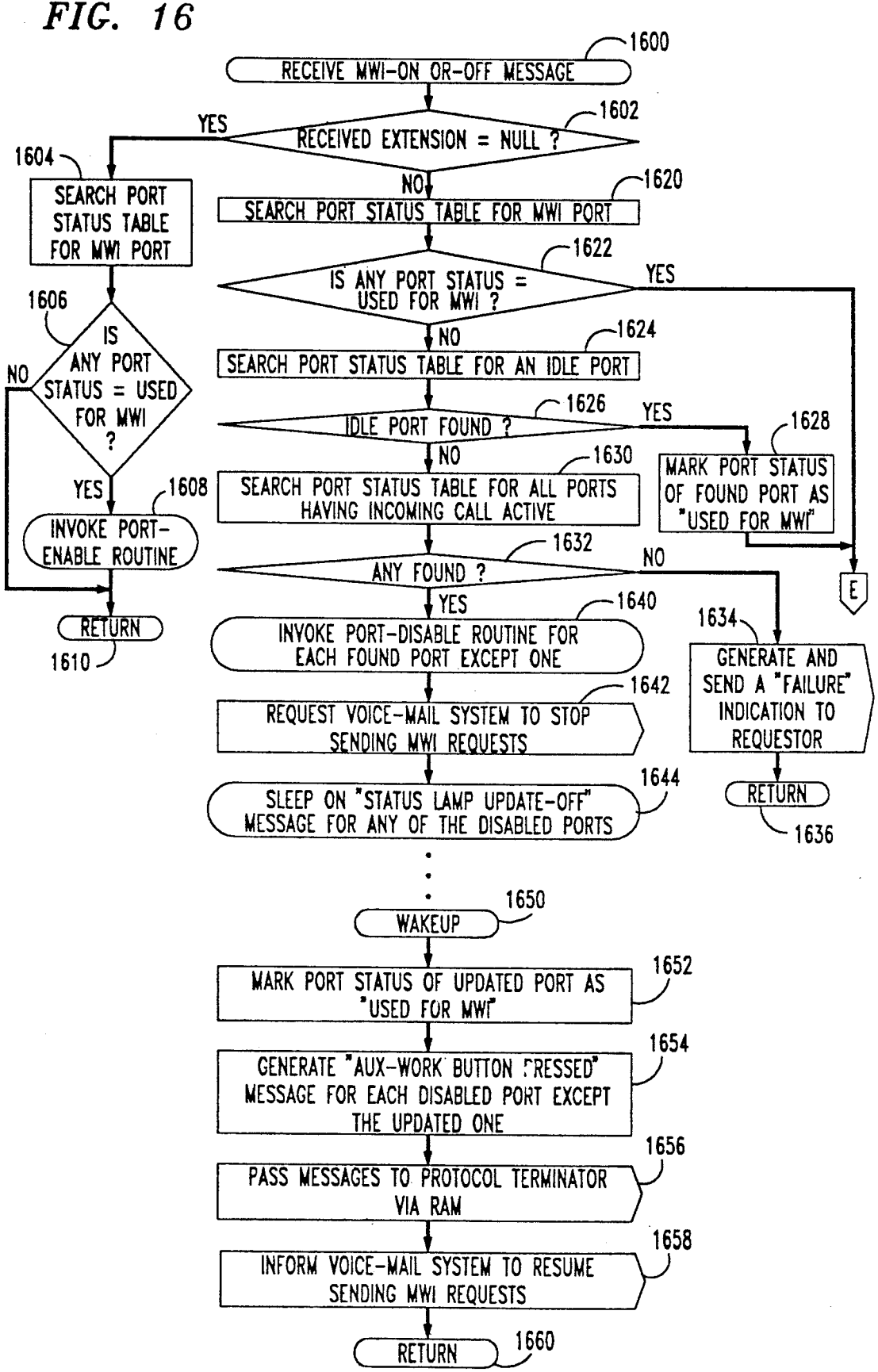
Figure 17:
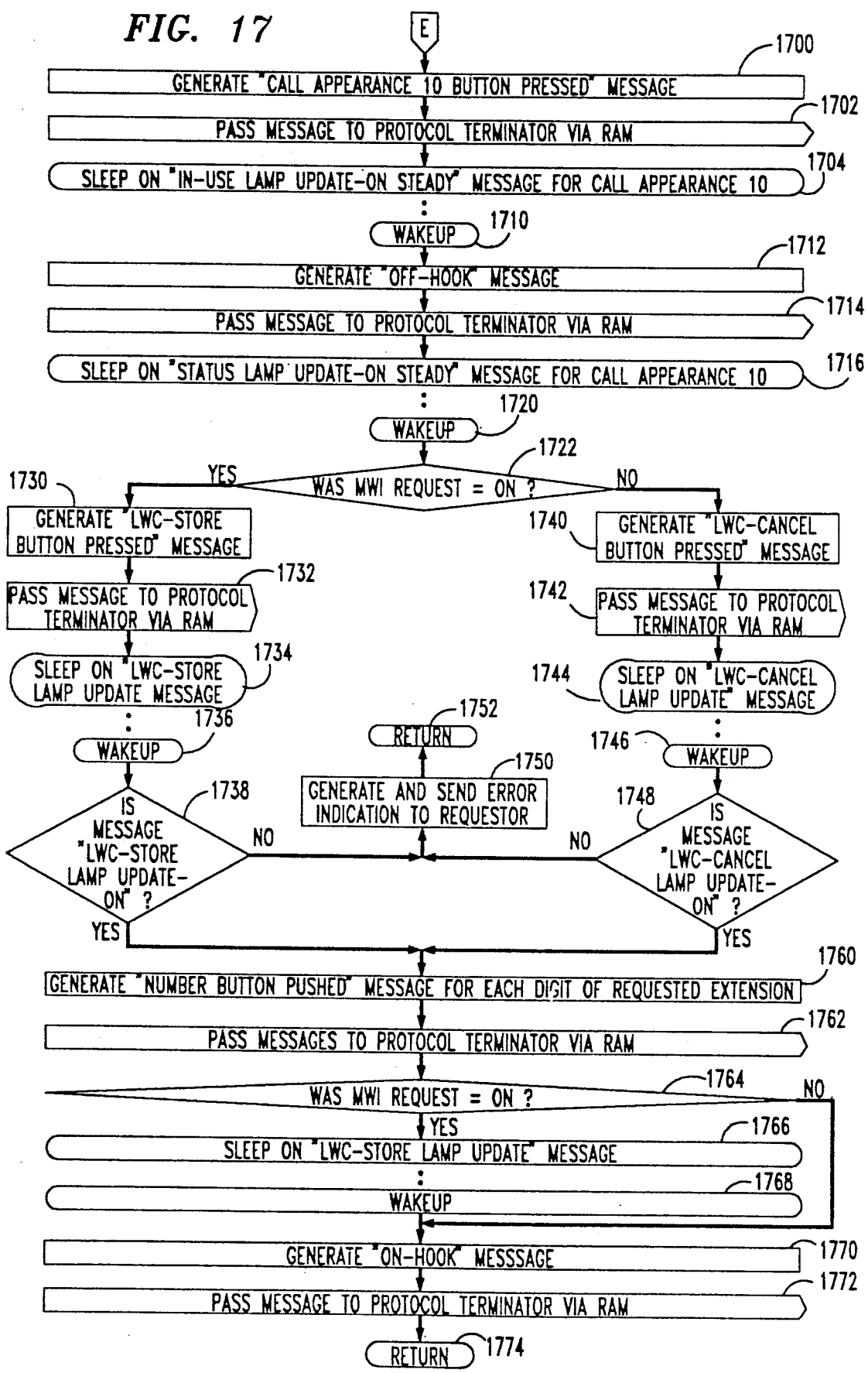

FIGS. 16 and 17 show a function invoked by receipt of any message-waiting indicator (MWI) update request for an extension number, at step 1600. In response, the function checks whether the extension number specified in the request is null, at step 1602. If so, the function searches table 500 for any port 204 marked as "being used for MWI", at step 1604. If it finds such a port, as determined at step 1606, the function invokes the port-enable routine of FIG. 11, at step 1608, and then returns, at step 1610. If the function does not find a port 204 that is marked as "being used for MWI", it merely returns, at step 1610.

Returning to step 1602, if the extension specified in the request is not null, the function searches table 500 for any port 204 marked as "being used for MWI", at step 1620. If it finds such a port, as determined at step 1622, the function proceeds to the steps of FIG. 17; if it does not find such a port, the function searches table 500 for any port 204 having a status of "idle", at step 1624. If it finds an idle port, as determined at step 1626, the function marks the status of the idle port 204 in table 500 as "being used for MWI", at step 1628, and then proceeds to the steps of FIG. 17.

If no idle port 204 is found at steps 1624 and 1626, the function searches table 500 for all ports 204 indicated to have an incoming call active thereon, at step 1630. If no such port 204 is found, as determined at step 1632, the function generates a "failure" indication and sends it to the entity that made the request in step 1600, at step 1634. The function then returns, at step 1636.

Returning to step 1632, if any port 204 is found to have an incoming call active thereon, the function sequentially invokes the port-disable routine of FIG. 10 for every such found port 204 except one, at step 1640. Following return from the last invocation of the port-disable routine, the function requests voice-mail system 200 to stop sending MWI requests, at step 1642, and goes to sleep to await receipt of a "status lamp update-off" message for any one of the ports 204 that were disabled at step 1640, at step 1644. When the awaited message for one of these disabled ports 204 is received, the function is awakened, at step 1650, as described at steps 700-704 of FIG. 7. The awaited message indicates that the corresponding port 204 has been freed up, and the function now marks its status in table 500 as "being used for MWI", at step 1652. The function then generates an "aux-work button pressed" message for every port that was disabled at step 1640 except for the one that was marked as "being used for MWI" at step 1652, at step 1654, and sends the messages to processor 101 via protocol interface 210, at step 1656, thereby to re-enable those ports 204. The function then informs voice-mail system 200 to resume sending MWI requests, at step 1658, and returns, at step 1660. System 200 will now repeat the MWI update request that it had made previously at step 1600.

Turning now to FIG. 17, this leg of the routine is taken when a port 204 marked as "being used for MWI" is found. In response, the routine generates a "call appearance 10 button pressed" message for the marked port 204, at step 1700, and sends it to processor 101 via protocol interface 210, at step 1702. The routine then goes to sleep to await receipt of an "in-use lamp update-on steady" message for this bridged call appearance 10, at step 1704. Upon receipt of the awaited message, the routine is awakened, at step 1710. In response, it generates an "off-hook" message, at step 1712, and sends it to processor 101 via protocol interface 210, at step 1714. The routine then returns to sleep to await receipt of a "status lamp update-on steady" message for the bridged call appearance 10, at step 1716. Upon receipt thereof, the routine is again awakened, at step 1720. Its activity now depends on whether the request received at step 1600 of FIG. 16 was to turn an MWI "on" or "off", as determined at step 1722.

If the request was to turn an MWI "on", the routine generates an "lwc-store button pressed" message for the marked port 204, at step 1730, and sends it to processor 101 via protocol interface 210, at step 1732. The routine then goes to sleep to await receipt of an "lwc-store lamp update" message for the marked port 204, at step 1734. Upon receipt of the awaited message, the routine is awakened, at step 1736, and it checks the message to determine if it is an "lwc-store lamp update-on" message, at step 1738. If not, the routine generates an "error" indication and sends it to the originator of the MWI request, at step 1750, and then returns, at step 1752. If the message is determined at step 1738 to be an "lwc-store lamp update-on" message, the routine generates "number button pushed" messages for each digit of the extension whose MWI is to be updated, at step 1760, and sends them to processor 101 via protocol interface 210, at step 1762. The routine then again checks whether the request received at step 1600 of FIG. 16 was to turn an MWI "on", at step 1764. If so, the routine goes to sleep to await receipt of an "LWC-store lamp update" message for the subject port 204, at step 1766. Upon receipt of the awaited message, the routine is awakened, at step 1768, and it generates an "on-hook" message, at step 1770, and also sends it to processor 101, at step 1772. Its MWI update task completed, the routine then returns, at step 1774.

Returning to step 1722, if it is there determined that the request was to turn an MWI "off", the routine generates an "lwc-cancel button pressed" message for the port 204 that is marked as "being used for MWI", at step 1740, and sends the message to processor 101 via protocol interface 210, at step 1742. The routine then goes to sleep to await receipt of an "lwc-cancel lamp update" message for the marked port 204, at step 1744. Upon receipt of the awaited message, the routine is awakened, at step 1746, and it checks the message to determine if it is an "lwc-cancel lamp update-on" message, at step 1748. If not, the routine proceeds to steps 1750 et seq.; if so, the routine proceeds to steps 1760 et seq. In the latter case, the routine determines at step 1764 that the request received at step 1600 of FIG. 16 was to turn an MWI "off", and responds by proceeding directly to steps 1770 et seq.

Figure 18:
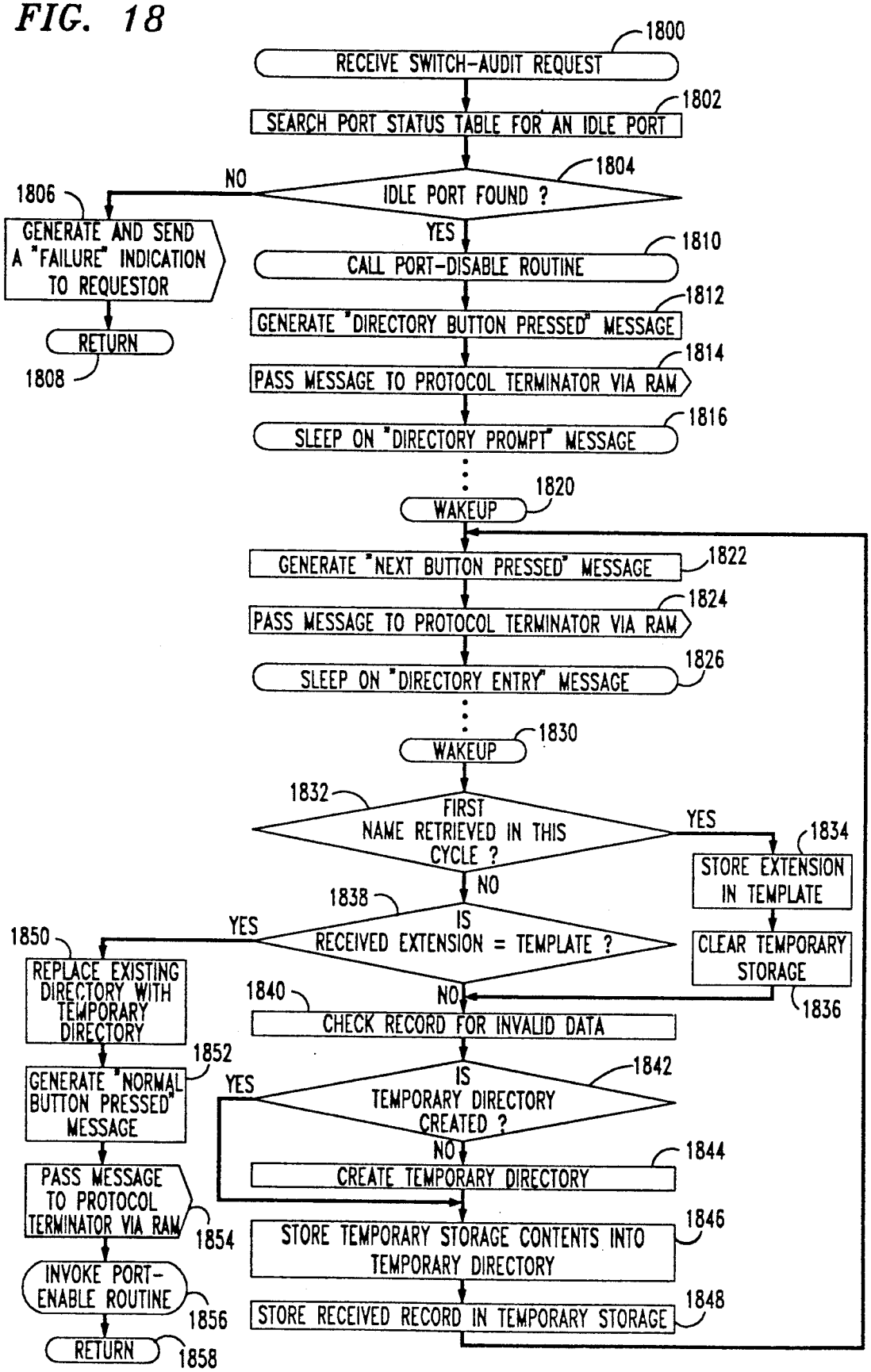

FIG. 18 shows a routine invoked by receipt of a switch-audit request, at step 1800. In response, the routine searches table 500 for a port 204 having a status of "idle", at step 1802. If no such port 204 is found, as determined at step 1804, the routine generates a "failure" indication and sends it to the requester, at step 1806. The routine then returns, at step 1808.

If an idle port 204 is found at step 1804, the routine invokes the port-disable routine of FIG. 10 for this idle port 204, at step 1810. Upon return of the port-disable routine, the switch-audit routine generates a "directory button pressed" message for the subject port 204, at step 1812, and sends it to processor 101 via protocol interface 210, at step 1814. The routine then goes to sleep to await receipt of a "directory prompt" message, at step 1816.

Receipt of the awaited message results in the routine being awakened, at step 1820, and it responds by generating a "next button pressed" message, at stop 1822, and sending it to processor 101, at step 1824. The routine then returns to sleep to await receipt of a "directory entry" message, at step 1826. Upon receipt of this message and its resultant awakening, at step 1830, the routine checks whether this message's contents are the first directory name retrieved in this cycle, i.e., during this invocation of the switch-audit routine, at step 1832. Illustratively, the routine makes the determination by checking whether template 503 (see FIG. 5) is empty. If the answer to the check at step 1832 is affirmative, the routine stores the extension contained in the received "directory entry" message in template 503, at step 1834, and clears temporary storage 504 (see FIG. 5), at step 1836. If the answer to the check at step 1832 is negative, the routine compares the extension contained in the received "directory entry" message against the contents of template 503 to determine if they are the same, at step 1838.

If the extension numbers compared at step 1838 are not the same, or following step 1836, the routine verifies the contents of the received "directory entry" message, at step 1840. The routine then checks whether a temporary directory 502 (see FIG. 5) has been created, at step 1842. On the first pass through step 1842, the answer will be negative, so the routine creates a temporary directory 502, at step 1844.

Following step 1844, or if the check at step 1842 reveals that a temporary directory 502 exists, the routine stores contents of temporary storage 504 into temporary directory 502, at step 1846, and then stores contents of the received "directory entry" message into temporary storage 504, at step 1848. The routine then returns to step 1822 to obtain another directory entry from processor 101.

Returning to step 1838, if it is there determined that the just-received extension matches the extension stored in template 503, it indicates that the full directory has been retrieved from processor 101. The routine therefore replaces existing directory 501 with temporary directory 502, at step 1850. The routine also generates a "normal button pressed" message, at step 1854, and sends it to processor 101 via protocol interface 210, at step 1856. The routine then invokes the port-enable routine of FIG. 11 with respect to the port 204 that was used for directory retrieval, at step 1858, and returns, at step 1860.

Of course, it should be understood that various changes and modifications to the illustrative embodiment described above will be apparent to those skilled in the art. For example, the adjunct need not be physically located in the switching system's main cabinet, but may be located in a remote port module, or any other port carrier that is a part of the switching system. Or, multiple ones of the adjuncts may be included in a single switching system. Also, the protocol interface need not be a separate physical entity within the adjunct, but may be implemented as a driver (i.e., a software program) that runs as part of the voice-mail system module. Furthermore, enhancements may be made to the switching system control software and its interactions with the adjunct wherein the true identity of the adjunct is no longer transparent to the control software. Such changes and modifications can be made without departing from the spirit and the scope of the invention and without diminishing its attendant advantages. It is therefore intended that all such changes and modifications be covered by the following claims.

We claim:

1. A telecommunications switching system comprising:
   control processing means for controlling operation of the switching system;
   a communications medium connected to the control processing means;
   a plurality of port circuits connected to the medium, each for interfacing a telephone to the medium and enabling the telephone to communicate with the control processing means via the medium, the port circuits including a digital port circuit for interfacing a digital display telephone to the medium and enabling the digital display telephone to communicate with the control processing means; and
   an adjunct processor connected to the medium directly without intermediacy of a separate port circuit, for providing a telecommunications feature by communicating with the control processing means both exclusively via the medium and in an identical manner as the digital display telephone, the adjunct processor emulating at least one said digital port circuit in its every connection to the medium and emulating the digital display telephone in its communications through each of the emulated digital port circuits with the control processing means to provide the telecommunications feature for each of the emulated digital port circuits.

2. The system of claim 1 wherein;
   the medium is a communications switching medium for switching communications between port circuits;
   each port circuit is for interfacing a telephone line and a telephone connected to that line to the medium;
   the control processing means comprise a control processor for providing telecommunications services by exchanging control communications with the telephones via the medium; and
   the adjunct processor is physically incorporated into the switching system and communicates with the control processor exclusively via the medium directly without use of a telephone line and a corresponding port circuit.

3. The system of claim 1 wherein
   the adjunct processor comprises:
   a feature module for providing a telecommunications feature;
   medium interface means for connecting the feature module to the medium by emulating a connection of a port circuit to the medium; and
   control communications interface means for facilitating exchange of control communications between the feature module and the control processing means through the medium by emulating a telephone to the control processing means.

4. The system of claim 3 wherein
   the control communications interface means further emulate a control communications link to the feature module and convert control communications being exchanged by the feature module and the control processing means between a form used by the control communications link and a form used by the control processing means to communicate with a telephone.

5. The system of claim 1 wherein
   the adjunct processor comprises:
   a voice-mail module having a plurality of voice ports and a control port;
   first means for interfacing the voice ports and the control port to the medium by emulating a port circuit to the medium; and
   second means for interfacing the voice-mail module to the control processing means through the first means and the medium by emulating a telephone to the control processing means with respect to control communications exchanged between the adjunct processor and the control processing means.

6. The system of claim 5 wherein
   the second means further emulate a control communications link to the voice-mail module and convert control communications being exchanged by the voice-mail module and the control processing means between a form used by the control communications link and a form used by the control processing means to communicate with a telephone.

7. An adjunct processor for use as an integral part of a telecommunications switching system having a control processor for controlling operations of the switching system, a communications medium connected to the control processor, and a plurality of port circuits connected to the medium and each for interfacing a telephone to the medium and enabling the telephone to communicate with the control processor via the medium, the port circuits including a digital port circuit for interfacing a digital display telephone to the medium and enabling the digital display telephone to communicate with the control processing means, the adjunct processor comprising:
   feature means for providing a telecommunications feature by exchanging control communications with the control processor;
   first emulating means coupled to the feature means for connecting the feature means to the medium directly without intermediacy of a separate port circuit, by emulating at least one said digital port circuit in every connection of the feature means to the medium; and
   second emulating means coupled to the feature means for communicating with the control processor on behalf of the feature means through the first emulating means exclusively via the medium and in an identical manner as the digital display telephone, by emulating the digital display telephone in its communications through each of the emulated digital port circuits with the control processor to provide the telecommunications feature for each of the emulated digital port circuits.

8. The adjunct processor of claim 7 wherein
   the second emulating means further emulate a control communications link to the feature means and convert control communications being exchanged by the feature means and the control processor between a form used by the control communications link and a form used by the control processor to communicate with a telephone.

9. The adjunct processor of claim 7 wherein the feature means comprise a voice-mail module having a plurality of voice ports and a control port;

the first emulating means comprise means for interfacing the voice ports and the control port to the medium by emulating a port circuit to the medium; and the second emulating means comprise means for interfacing the voice-mail module to the control processor through the first emulating means and the medium by emulating a telephone to the control processor with respect to control communications exchanged between the voice-mail module and the control processor.

10. The adjunct processor of claim 9 wherein the second emulating means further emulate a control communications link to the voice-mail module and convert control communications being exchanged by the voice-mail module and the control processor between a form used by the control communications link and a form used by the control processor to communicate with a telephone.

* * * * *